Oct. 31, 1961  J. BAJER  3,006,672
RESILIENT MOUNTING MEANS FOR PIVOTAL CONNECTION
Filed Dec. 30, 1959

JACQUES BAJER
INVENTOR.

BY John R. Faulkner
Thomas H. Oster

ATTORNEYS

United States Patent Office 3,006,672
Patented Oct. 31, 1961

3,006,672
RESILIENT MOUNTING MEANS FOR PIVOTAL CONNECTION
Jacques Bajer, Dearborn, Mich., assignor to Ford Motor Company, Dearborn, Mich., a corporation of Delaware
Filed Dec. 30, 1959, Ser. No. 862,838
9 Claims. (Cl. 287—85)

This invention relates generally to a mounting structure and more particularly to a mounting structure of the resilient type.

An object of the invention is to provide a resilient bushing mounting adapted to support an eye member in which the bushing mounting is secured against rotational movement in relation to a structural member forming part of a connection in a motor vehicle so that any torsional deflection of an oscillating eye member is completely taken up by the resilient bushing itself.

The object of this invention is accomplished by assembling the eye member, such as a shock absorber, on a spool-type resilient bushing which is mounted on a tube with serrated annular ends until the bushing seats itself in the eye of the eye member. Two retainers are pressed on each end of the tube causing the bushing to distort, thereby resiliently restraining the transverse movement of the eye member in relation to the bushing. The bushing mounting when disposed between a bifurcated structural member of a motor vehicle and secured by a bolt extending through the tube and openings in the bifurcated member will cause the serrated edges of the tube to engage the inner surfaces of the bifurcated member preventing rotational movement of the bushing mounting in relationship to the structural member when the eye member is oscillating. The resilient bushing mounting in this invention can be utilized as an oscillating connection to connect any link member to a bifurcated member which is either fastened to a frame or part of a movement member in a suspension system of a motor vehicle.

It is to be understood that the term "frame" may include the embodiment of a frameless or unit-type body as well as the conventional vehicle frame.

A further object of this invention is to provide an oscillating connection which is easy to assemble and cannot be accidentally loosened by vibration.

Further objects and advantages of the present invention will be apparent in the following description, reference being had to the accompanying drawings where like numerals are applied to like parts in the several views.

Figure 1:
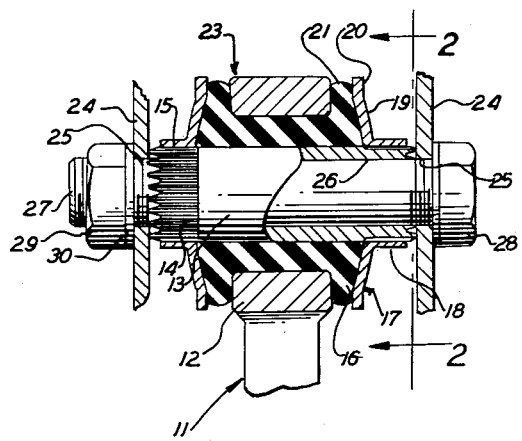
FIGURE 1 is a sectional view of the bushing mounting supporting an eye member assembled with a bifurcated structural member.

Referring to FIGURE 1, the eye member 11 has a mounting eye 12 which is in the form of an annulus. A tube 13 provided with serrations 14 on the periphery of the end portions 15 of the tube 13 is positioned axially within the mounting eye 12. Disposed between the tube 13 and the mounting eye 12 is an elastomeric spool-type bushing 16 with the inner periphery of the mounting eye 12 positioned on the smaller outer periphery of the medial portion of the spool-type bushing 16.

Figure 3:
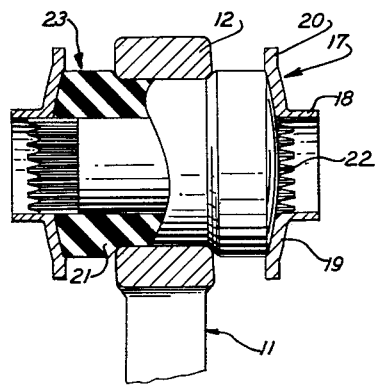
FIGURE 3 is a view of the bushing mounting partially in section prior to preloading the bushing before assembly with the bifurcated structural member.

The serrated end portions 15 of the tube 13 receive a pair of retainers 17, one retainer on each end portion 15 of the tube 13, as shown in FIGURE 3. The retainer 17 consists of a hub 18 with outwardly extending, radially curved flange 19 with an annular lip 20. The retainers 17 are positioned on the end portions 15 of the tube 13 so that the curved flanges 19 of the retainers 17 abut the annular surface of the rim 21 of the spool-type bushing 16. The inner periphery of the hub 18 of the retainer 17 fits tightly on the serrated end portion 15 of the tube 13.

When the retainers 17 are pressed onto the serrated peripheral end portions 15 of the tube 13, the retainers 17 confine and compress bushing 16, thereby distorting the bushing 16 through compression around the mounting eye 12 of the oscillating link 11, as shown in FIGURE 1, resiliently restraining the longitudinal and lateral movement of the eye member 11 relative to the tube 13 and also preventing rotational movement between the inner periphery of the mounting eye 12 of the eye member 11 and the smaller outer periphery of the medial portion of the bushing 16 and between the bore of the bushing 16 and the outer periphery of the tube 13.

The serrated peripheral surface of the end portions 15 of the tube 13 secures the retainers 17 to the tube 13 upon assembly by deforming the serrations 14, thereby locking the inner peripheral surface of the hubs 18 of the retainers 17 on the outer surface of the end portions 15 of the tube 13 preventing the loosening of the retainers 17 when the bushing mounting is subjected to torsional and axial deflections.

Figure 2:
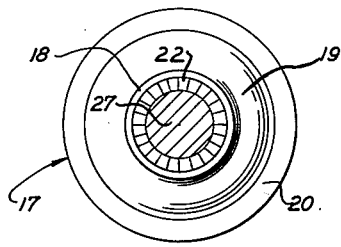
FIGURE 2 is a sectional view taken along line 2—2 of FIGURE 1.

The annular ends of the tube 13 are extended through the hubs 18 of the retainers 17 after the retainers 17 are pressed onto the tube 13. The exposed annular ends of the tube 13 have serrated edges 22, best shown in FIGURE 2.

The bushing mounting assembly 23, as formed by the eye member 11 secured by the bushing 16 and compressed by the retainers 17 locked onto the tube 13, is positioned between the bifurcated structural member 24 so that the apertures 25 of the furcations of the bifurcated structural member 24 are coaxial with the bore 26 of the tube 13.

A pin-like member 27 provided with a head 28 which is of a larger diameter than the apertures 25 in the furcations is mounted in the tube 13 and the apertures 25 in the furcations of the bifurcated structural member 24. The head 28 of the pin-like member 27 abuts the outer surface of one furcation of the bifurcated structural member 24 and the other end of the pin-like member 27 extending through the other furcation of the bifurcated structural member 24 is axially secured to the bifurcated structural member by a threaded locking means comprising a nut 29 and a locker washer 30.

The securing of the pin-like member 27 to the bifurcated structural member 24 compresses the furcations and thereby engages the serrated annular ends 22 of the tube 13 with the inner surface of the furcations of the bifurcated structural member 24 preventing rotational movement between the tube 13 and the bifurcated structural member 24. Therefore, any torsional deflection of the oscillating eye member 11 is absorbed by the preloaded elastomeric spool-type bushing 16. As the eye member 11 oscillates, the bushing 16 torsionally deflects while the tube 13 and the retainers 17 remains stationary in relation to the bifurcated structural member 24.

It is understood that the term "elastomeric" used herein is used in its broadest sense and includes resilient material such as rubber, butadiene styrene copolymers, butadiene acrylonitrile copolymers, polychloroprenes or any compatible mixtures thereof. Bushings formed from any of these materials are well known in the art and form no part of this invention.

While the form of the embodiment of the invention as herein disclosed constitutes a preferred form, it is to be understood that other forms might be adapted as may come within the scope of the claims which follow.

I claim:

1. A resilient bushing mounting for an eye member comprising in combination a cylindrical member, an elastomeric bushing embracing said cylindrical member, a pair of retainers, each retainer having a bore receiving an end portion of said cylindrical member and a radially outwardly extending flange adjacent one end of said elastomeric bushing, and interlocking means between said cylindrical member and said retainers preventing relative rotation therebetween, said elastomeric bushing being held in a state of compression by assembly of said retainers on said cylindrical member and resiliently restraining said eye member against substantial longitudinal and lateral movement in relation to said cylindrical member.

2. In a vehicle suspension system having a body structural member and an eye member adapted to be pivotally supported upon said body member, a resilient bushing mounting comprising in combination an elastomeric bushing provided with a bore, a cylindrical member adapted to fit the bore of said bushing, a pair of retainers, each retainer provided with a bore and a radially outwardly extending flange, said cylindrical member having end portions received within the bore of said retainers, said bushing interposed between the retainers, interlocking means between said cylindrical member and said retainers preventing relative rotation therebetween, and a further interlocking means nonrotatably connecting said resilient bushing mounting to said body structural member.

3. The structure of claim 1 which is further characterized in that said cylindrical member is provided with axially extending serrations on the peripheral portion of said member adapted to interlock with the bores of the retainers to prevent rotation therebetween.

4. The structure of claim 2 which is further characterized in that said cylindrical member is provided with a plurality of serrations on one end adapted to engage said body structural member and to interlock therewith to prevent rotation between said cylindrical member and said body member.

5. In the vehicle suspension system comprising a body structural member having spaced supporting walls with apertures in said walls and an eye member adapted to be pivotally supported upon said member, a resilient bushing mounting comprising in combination an elastomeric spool-type bushing provided with a bore, a tube adapted to fit the bore of said bushing, a pair of retainers, each retainer provided with a hub having a bore and with a radially outwardly extending flange, said tube having axially extending serrations on the peripheral end portions adapted to interlock with the bore in the hub of said retainers to prevent rotation therebetween, said bushing interposed between said retainers and held in a state of compression by the assembly of said retainers on said tube, said tube having a serrated annular edge on both ends, a pin-like member extending through the apertures of said supporting walls and journalled in said tube of the resilient bushing mounting, means associated with said pin-like member for retaining and axially compressing said resilient bushing mounting and said supporting walls of support member relative to said pin-like member, said serrated annular edges of said tube engaging the inner surfaces of said supporting walls of the body structural member to interlock, preventing rotation of said cylindrical member in relation to said body structural member.

6. A resilient bushing mounting for an eye member comprising in combination a cylindrical member having end portions, an elastomeric bushing embracing said cylindrical member, a pair of retainers, each retainer having a bore receiving one end portion of said cylindrical member and having a radially outwardly extending flange adjacent one end of said elastomeric bushing, one of the end portions of said cylindrical member having a deformation on its periphery, said deformation adapted to interlock with the bore of one of said retainers to prevent rotational movement between said cylindrical member and said retainer, said elastomeric bushing being held in a state of compression by the assembly of said retainers on said cylindrical member and resiliently restraining said eye member against substantial longitudinal and lateral movement in relation to said cylindrical member.

7. In a vehicle suspension system having a body structural member and an eye member adapted to be pivotally supported upon said body member, a resilient bushing mounting comprising in combination an elastomeric bushing provided with a bore, a cylindrical member adapted to fit the bore of said bushing, said cylindrical member having end portions, a pair of retainers, each retainer provided with a bore and a radially outwardly extending flange, said end portions of the cylindrical member each having at least one deformation on their peripheries, one of said end portions having at least a second deformation on its end, said end portions received within the bores of said retainers, the deformation on the periphery of each end portion adapted to interlock with the bores of said retainers to prevent rotational movement therebetween, said bushing interposed between the flanges of said retainers, and a mounting member for assembling said resilient bushing mounting to said body structural member, said mounting member adapted to compress said body structural member to force said second deformation on the end of one of said end portions into engagement with said body structural member to prevent rotational movement between said resilient bushing mounting and said body structural member.

8. A resilient bushing mounting for an eye member comprising in combination a cylindrical member, an elastomeric bushing embracing said cylindrical member, a pair of retainers, each retainer having a bore receiving an end portion of said cylindrical member and having a radially outwardly extending flange, said flange of each retainer being adjacent one end of said elastomeric bushing, and interlocking means between said cylindrical member and said retainers to prevent axial movement therebetween, the retainers when assembled on said cylindrical member holding said elastomeric bushing in a state of compression.

9. In a vehicle suspension system comprising a body structural member having spaced supporting walls and an eye member adapted to be pivotally supported upon said member, a resilient bushing mounting comprising in combination an elastomeric spool type bushing provided with a bore, a tube adapted to fit the bore of said bushing, a pair of retainers, each retainer provided with a hub having a bore and with a radially outwardly extending flange, said tube having axially extending serrations on the peripheral end portions adapted to interlock with the bore in the hub of said retainer to prevent rotation therebetween, said bushing interposed between said retainers on said tube, said tube having a serrated annular edge on both ends, and a mounting member for assembling said resilient bushing mounting to said body structural member, said mounting member adapted to compress said spaced supporting walls to force said serrated annular edges of said tube into engagement with the inner surfaces of said supporting walls of the body structural member to prevent rotational movement between said resilient bushing mounting and said body structural member.

References Cited in the file of this patent

UNITED STATES PATENTS

| | | |
|---|---|---|
| 1,913,513 | Rossman et al. | June 13, 1933 |
| 2,358,518 | Kraft | Sept. 19, 1944 |
| 2,659,619 | Kishline et al. | Nov. 17, 1953 |
| 2,749,160 | Cowles | June 5, 1956 |
| 2,787,486 | Thiry | Apr. 2, 1957 |
| 2,937,040 | Hutton | May 17, 1960 |

FOREIGN PATENTS

| | | |
|---|---|---|
| 620,882 | Great Britain | Mar. 31, 1949 |